United States Patent
Lee

(10) Patent No.: US 10,343,528 B2
(45) Date of Patent: Jul. 9, 2019

(54) VEHICLE CONTROL APPARATUS AND CONTROL METHOD THEREOF

(71) Applicant: MANDO CORPORATION, Pyeongtaek-si, Gyeonggi-do (KR)

(72) Inventor: Eun-Ha Lee, Cheonan-si (KR)

(73) Assignee: MANDO CORPORATION, Pyeongtaek-si, Gyeonggi-do (KR)

(*) Notice: Subject to any disclaimer, the term of this patent is extended or adjusted under 35 U.S.C. 154(b) by 16 days.

(21) Appl. No.: 15/685,413

(22) Filed: Aug. 24, 2017

(65) Prior Publication Data

US 2018/0056791 A1    Mar. 1, 2018

(30) Foreign Application Priority Data

Aug. 31, 2016  (KR) .................. 10-2016-0111263

(51) Int. Cl.
    *B60T 8/17*    (2006.01)
    *B60L 7/18*    (2006.01)
    *B60L 3/10*    (2006.01)
    *B60L 7/26*    (2006.01)

(52) U.S. Cl.
    CPC ............ *B60L 7/18* (2013.01); *B60L 3/108* (2013.01); *B60L 7/26* (2013.01); *B60L 2240/00* (2013.01); *B60L 2250/10* (2013.01); *B60L 2250/26* (2013.01)

(58) Field of Classification Search
    CPC ........ B60T 13/148; B60T 13/686; B60L 7/18; B60L 7/26; B60L 3/108
    USPC .................. 303/3, 15, 20, 146, 152; 701/22
    See application file for complete search history.

(56) References Cited

U.S. PATENT DOCUMENTS

| | | | |
|---|---|---|---|
| 2012/0158266 A1* | 6/2012 | Miyazaki | B60W 10/18 701/70 |
| 2013/0297134 A1* | 11/2013 | Saito | B60L 7/18 701/22 |
| 2014/0172211 A1* | 6/2014 | Kim | B60L 15/2009 701/22 |
| 2015/0038296 A1 | 2/2015 | Toyota | |

FOREIGN PATENT DOCUMENTS

KR    10-2014-0079158 A    6/2014

* cited by examiner

Primary Examiner — Christopher P Schwartz
(74) Attorney, Agent, or Firm — Hauptman Ham, LLP

(57) ABSTRACT

The vehicle control apparatus include: an inputter receive a regenerative braking signal and an anti-lock brake system operation signal output, and a driver's current necessary braking pressure value, in a regenerative braking state and in an ABS started state, a determiner determines whether the input driver's current necessary braking pressure value is in a first state in which the driver's current necessary braking pressure value is less than or equal to a set target pressure value, a calculator configured to calculate a current pressure value corresponding to a coast regeneration torque value when the input driver's current necessary braking pressure value is in the first state and a controller to convert the calculated current pressure value into a ratio of the current pressure value to the driver's current necessary braking pressure value to compensate for the target pressure value, and transmit a compensated target pressure value to the braking apparatus.

15 Claims, 7 Drawing Sheets

VEHICLE CONTROL APPARATUS AND CONTROL METHOD THEREOF

CROSS-REFERENCE TO RELATED APPLICATION

This application claims the benefit of Korean Patent Application No. 2016-0111263, filed on Aug. 31, 2016 in the Korean Intellectual Property Office, the disclosure of which is incorporated herein by reference.

BACKGROUND

1. Field

Embodiments of the present disclosure relate to a vehicle control apparatus and a control method thereof.

2. Description of the Related Art

Generally, in at least one of a conventional electric vehicle and a conventional hybrid vehicle, regenerative braking is performed by cooperative control of a friction brake torque for pressing a friction part and an electric motor brake torque to reduce a vehicle speed and charge a battery until the vehicle stops according to braking of a driver, and thus fuel efficiency is improved.

Specifically, in a vehicle in which a motor is installed, braking is performed by cooperation between a friction brake apparatus and a motor during braking. That is, a braking force according to a brake pedal pressure can be generated through frictional braking and regenerative braking. Accordingly, a necessary braking amount (braking force) of a driver is determined by a pressing depth of a brake pedal and is divided into the frictional braking and the regenerative braking. However, since a predetermined amount of torque input in a direction in which the vehicle travels when the vehicle is stopping and an amount of coast regeneration torque, which is a predetermined amount of torque input in a direction opposite the direction in which the vehicle travels when braking is performed during traveling, are not considered, a deviation between the braking forces can occur.

Particularly, since at least one of the conventional electric vehicle and the conventional hybrid vehicle has a limitation in constantly maintaining a braking force when anti-lock braking system (ABS) control is started in a state in which regenerative braking is being performed, there is a limitation in constantly maintaining deceleration.

Accordingly, since the at least one of the conventional electric vehicle and the conventional hybrid vehicle has a limitation in improving a deceleration feeling that a driver feels, there is a limitation in suppressing an abnormal feeling of braking.

Accordingly, a study of a vehicle control apparatus and a control method thereof which may improve a deceleration feeling that a driver feels to suppress an abnormal feeling of braking by constantly maintaining a braking force when ABS control starts to constantly maintain uniform deceleration in a state in which regenerative braking is being performed has recently and continuously been conducted.

SUMMARY

Therefore, it is an aspect of the present disclosure to provide a vehicle control apparatus capable of improving a deceleration feeling that a driver feels to suppress an abnormal feeling of braking, and a control method thereof.

In addition, it is also an aspect of the present disclosure to provide a vehicle control apparatus capable of suppressing a driver's anxiety about a state of current regenerative braking while inducing the driver to drive carefully, and a control method thereof.

Additional aspects of the disclosure will be set forth in part in the description which follows and, in part, will be obvious from the description, or may be learned by practice of the disclosure.

In accordance with one aspect of the present disclosure, a vehicle control apparatus includes: an inputter configured to receive a regenerative braking signal and an anti-lock brake system (ABS) operation signal output by a braking apparatus, and a driver's current necessary braking pressure value; a determiner configured to determine whether the input regenerative braking signal is in a regenerative braking state, whether the input ABS operation signal is in an ABS started state, and whether the input driver's current necessary braking pressure value is in a first state in which the driver's current necessary braking pressure value is less than or equal to a set target pressure value; a calculator configured to calculate a current pressure value corresponding to a coast regeneration torque value by using the coast regeneration torque value when the input driver's current necessary braking pressure value is in the first state; and a controller configured to convert the calculated current pressure value into a ratio of the current pressure value to the driver's current necessary braking pressure value to compensate for the target pressure value, and transmit a compensated target pressure value to the braking apparatus.

The determiner may determine whether the input driver's current necessary braking pressure value is in the first state when the regenerative braking state is in a regenerative braking cooperative control section.

The determiner may determine whether the input driver's current necessary braking pressure value is in the first state when the regenerative braking state is in a section in which a regenerative braking cooperative control section overlaps an ABS maintaining section in the ABS started state.

The determiner may further determine whether the input driver's current necessary braking pressure value is in the first state in which the driver's current necessary braking pressure value is less than or equal to the set target pressure value, when the determiner determines whether the input regenerative braking signal is in the regenerative braking state and the input ABS operation signal is in an ABS operation start prohibition state.

The calculator may calculate the current pressure value corresponding to the coast regeneration torque value during an ABS maintaining section in the ABS started state.

The calculator may calculate the current pressure value corresponding to the coast regeneration torque value during a section in which an ABS maintaining section in the ABS started state overlaps a coast regeneration torque applying section for applying a coast regeneration torque signal.

The controller may convert the calculated current pressure value into the ratio of the current pressure value to the driver's current necessary braking pressure value to compensate the target pressure value during a compensation pressure applying section for applying a compensation pressure signal for compensating for regenerative braking.

The controller may transmit the compensated target pressure value to the braking apparatus when the regenerative braking state is in a regenerative braking cooperative control section.

The controller may transmit the compensated target pressure value to the braking apparatus while the regenerative braking state is in a section in which a regenerative braking cooperative control section overlaps an ABS maintaining section in the ABS started state.

The controller may transmit the compensated target pressure value to the braking apparatus while the regenerative braking state is in a section in which a regenerative braking cooperative control section, an ABS maintaining section in the ABS started state, and a compensation pressure applying section for applying a compensation pressure signal for compensating for regenerative braking overlap.

The controller may transmit the compensated target pressure value to the braking apparatus while the regenerative braking state is in a section in which a time period in which a regenerative braking cooperative control section almost ends overlaps an ABS maintaining section in the ABS started state.

The controller may transmit the compensated target pressure value to the braking apparatus while the regenerative braking state is in a section in which a time period in which a regenerative braking cooperative control section almost ends, an ABS maintaining section in the ABS started state and a compensation pressure applying section for applying a compensation pressure signal for compensating for regenerative braking overlap.

A pulse pattern of the compensated target pressure value may gradually rise by a predetermined slope for an initial maintaining time period of an ABS maintaining section in the ABS started state, maintain a predetermined level for a middle maintaining time period after the initial maintaining time period, and gradually fall by a predetermined slope from a time at which the ABS maintaining section almost ends in the ABS maintaining section.

In accordance with another aspect of the present disclosure, a vehicle control method includes: inputting a regenerative braking signal and an ABS operation signal output from a braking apparatus, and a driver's current necessary braking pressure value; determining whether the input regenerative braking signal is in a regenerative braking state, whether the input ABS operation signal is in the ABS started state, and whether the driver's current necessary braking pressure value that was input is in a first state in which the driver's current necessary braking pressure value is less than or equal to a set target pressure value; calculating a current pressure value corresponding to a coast regeneration torque value by using the coast regeneration torque value when the input driver's current necessary braking pressure value is in the first state; and compensating for a target pressure value by converting the calculated current pressure value into a ratio of the calculated current pressure value to the driver's current necessary braking pressure value, and transmitting a compensated target pressure value to the braking apparatus.

The determining may further determine whether the input driver's current necessary braking pressure value is in the first state in which the driver's current necessary braking pressure value is less than or equal to the set target pressure value, when the determining determines whether the input regenerative braking signal is in the regenerative braking state and the input ABS operation signal is in an ABS operation start prohibition state.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
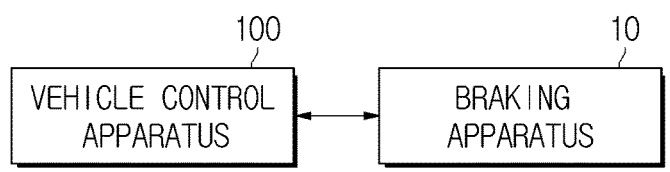
FIG. 1 is a block diagram showing a state in which a vehicle control apparatus according to one embodiment of the present disclosure is connected to a braking apparatus.

Hereinafter, embodiments of the present disclosure will be described in detail with reference to the accompanying drawings. The present embodiments are provided to fully explain the spirit and scope of the present disclosure to those skilled in the art. Thus, the present disclosure is not to be construed as limited to the present embodiments set forth herein and may be embodied in various other forms. Parts irrelevant to the description are omitted in the drawings to clearly explain the present disclosure. Sizes of elements in the drawings may be exaggerated to facilitate understanding.

Figure 2:
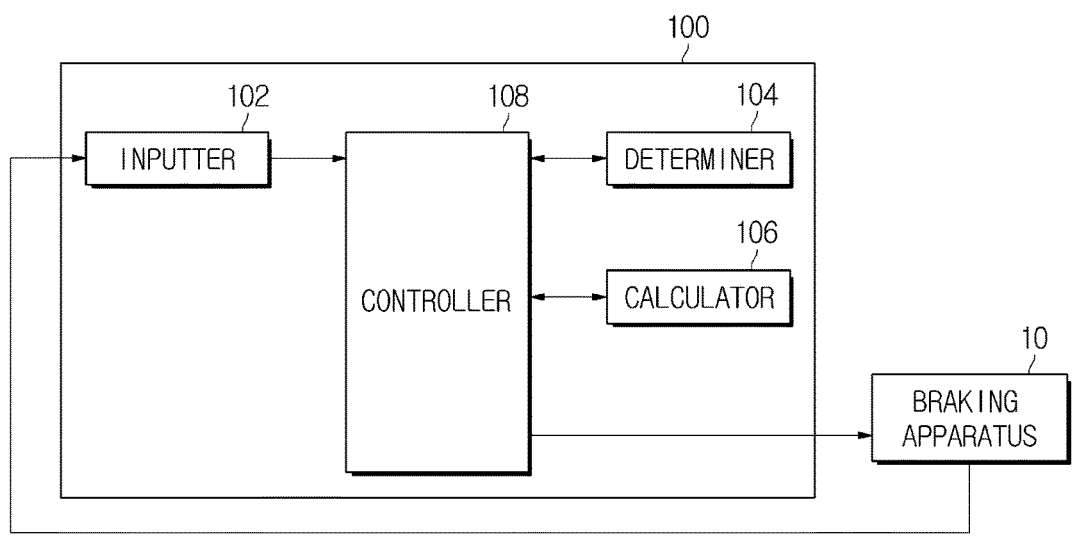
FIG. 2 is a block diagram showing one example of the vehicle control apparatus shown in FIG. 1.

FIG. 1 is a block diagram showing a state in which a vehicle control apparatus according to one embodiment of the present disclosure is connected to a braking apparatus, and FIG. 2 is a block diagram showing one example of the vehicle control apparatus shown in FIG. 1.

Figure 3:
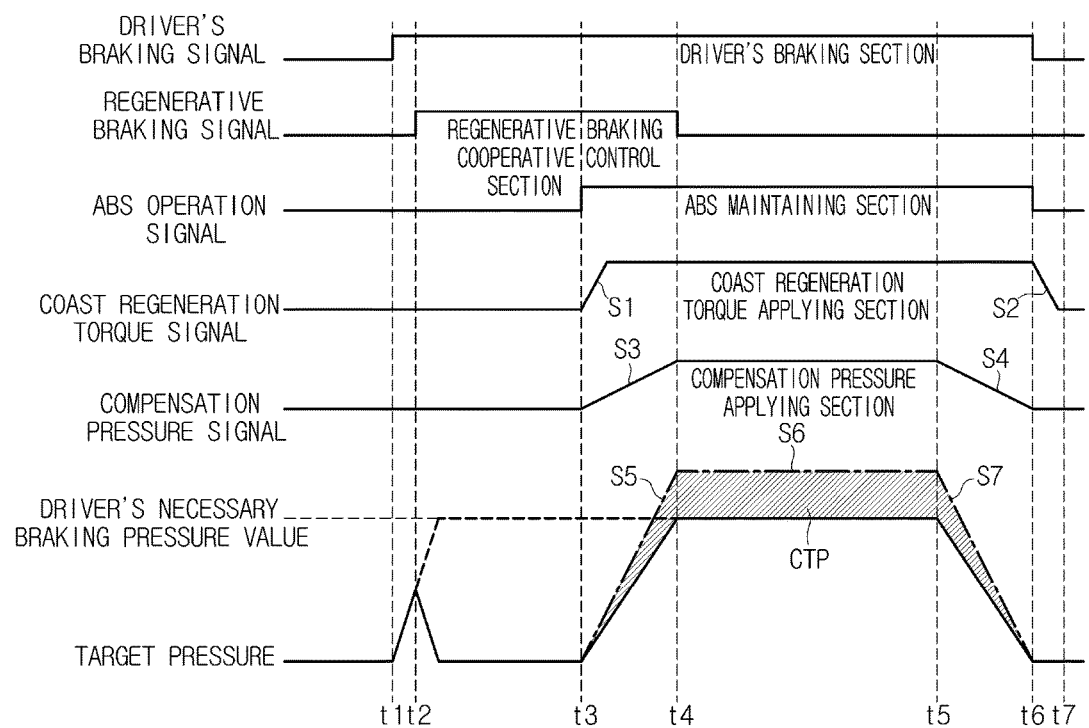
FIG. 3 is a waveform diagram showing a process in which a controller shown in FIG. 2 transmits a compensated target pressure (CTP) value to a braking apparatus during an anti-lock braking system (ABS) maintaining section, a coast regeneration torque applying section, and a compensation pressure applying section in a state in which the controller performs regenerative braking during a driver's braking section and a regenerative braking cooperative control section.

FIG. 3 is a waveform diagram showing a process in which a controller shown FIG. 2 transmits a compensated target pressure (CTP) value to a braking apparatus during an anti-lock braking system (ABS) maintaining section, a coast regeneration torque applying section, and a compensation pressure applying section in a state in which the controller performs regenerative braking during a driver's braking section and a regenerative braking cooperative control section.

Referring to FIGS. 1 to 3, a vehicle control apparatus 100 according to one embodiment of the present disclosure includes an inputter 102, a determiner 104, a calculator 106, and a controller 108.

The inputter 102 receives a regenerative braking signal, an ABS operation signal, and a driver's current necessary braking pressure value from a braking apparatus 10.

The determiner 104 determines whether the regenerative braking signal input to the inputter 102 is in a regenerative braking state and whether the ABS operation signal input to the inputter 102 is in an ABS started state according to control of the controller 108.

In addition, the determiner 104 determines whether the driver's current necessary braking pressure value input to the inputter 102 is in a first state in which the driver's current necessary braking pressure value is less than or equal to a set target pressure value, according to the control of the controller 108.

Here, as illustrated in FIGS. 2 and 3, the determiner 104 may determine whether the regenerative braking signal is in the regenerative braking state, whether the ABS operation signal is in the ABS started state, and whether the driver's current necessary braking pressure value is in the first state in which the driver's current necessary braking pressure value is less than or equal to the set target pressure value during driver's braking section t1 to t6 for applying a driver's braking signal, according to the control of the controller 108.

As one example, as illustrated in FIGS. 2 and 3, when the regenerative braking state is in regenerative braking cooperative control section t2 to t4, the determiner 104 may determine whether the driver's current necessary braking pressure value is in the first state in which the driver's current necessary braking pressure value is less than or equal to the set target pressure value, according to the control of the controller 108.

As another example, as illustrated in FIGS. 2 and 3, when the regenerative braking state is in a section in which the regenerative braking cooperative control section t2 to t4 overlaps the ABS maintaining section t3 to t6 in the ABS started state, the determiner 104 may determine whether the driver's current necessary braking pressure value is in the first state in which the driver's current necessary braking pressure value is less than or equal to the set target pressure value, according to the control of the controller 108.

In addition, as still another example, although not illustrated in the drawing, when the determiner 104 determines whether an input regenerative braking signal is in the regenerative braking state and an input ABS operation signal is determined in an ABS operation start prohibition state by the determiner 104, the determiner 104 may determine whether an input driver's current necessary braking pressure value is in the first state in which the input driver's current necessary braking pressure value is less than or equal to the set target pressure value, according to the control of the controller 108.

When the regenerative braking signal is determined in the regenerative braking state, the ABS operation signal is determined in the ABS started state, and the driver's current necessary braking pressure value is determined in the first state, in which the driver's current necessary braking pressure value is less than or equal to the set target pressure value, by the determiner 104, the calculator 106 calculates a current pressure value corresponding to a coast regeneration torque value, which is a braking force generated by an electric motor to perform regenerative braking in the electric motor of the braking apparatus 10, by using the coast regeneration torque value according to control of the controller 108.

Here, the calculator 106 may use a coast regeneration torque value which decreases to "zero" for a stability of a vehicle when ABS braking starts, and may calculate the current pressure value corresponding to a coast regeneration torque value for compensating for a lost coast regeneration torque value according to the control of the controller 108.

As one example, as illustrated in FIGS. 2 and 3, the calculator 106 may calculate a current pressure value corresponding to the coast regeneration torque value during the ABS maintaining section t3 to t6 in the ABS started state according to control of the controller 108.

That is, as illustrated in FIGS. 2 and 3, the calculator 106 may calculate the current pressure value corresponding to the coast regeneration torque value according to the control of the controller 108 during a section in which the ABS maintaining section t3 to t6 in the ABS started state overlaps a coast regeneration torque applying section t3 to t7 for applying a coast regeneration torque signal.

The controller 108 converts the current pressure value calculated by the calculator 106 into a ratio of the current pressure value to the driver's current necessary braking pressure value to compensate for the target pressure value, and transmits the CTP value to the braking apparatus 10.

As one example, as illustrated in FIGS. 2 and 3, the controller 108 converts the current pressure value calculated by the calculator 106 into the ratio of the current pressure value to the driver's current necessary braking pressure value to compensate for the target pressure value during a compensation pressure applying section t3 to t6 for applying a compensation pressure signal for compensating for regenerative braking.

As another example, as illustrated in FIGS. 2 and 3, the controller 108 may transmit the CTP value to the braking apparatus 10 when the regenerative braking state is in the regenerative braking cooperative control section t2 to t4.

As still another example, as illustrated in FIGS. 2 and 3, the controller 108 may transmit the CTP value to the braking apparatus 10 while a regenerative braking state is in a section in which the regenerative braking cooperative control section t2 to t4 overlaps the ABS maintaining section t3 to t6 in the ABS started state.

As yet another example, as illustrated in FIGS. 2 and 3, the controller 108 may transmit the CTP value to the braking apparatus 10 while a regenerative braking state is in a section in which the regenerative braking cooperative control section t2 to t4, the ABS maintaining section t3 to t6 in the ABS started state and the compensation pressure applying section t3 to t6 for applying compensation pressure signal for compensating for regenerative braking overlap.

As yet another example, as illustrated in FIGS. 2 and 3, the controller 108 may transmit the CTP value to the braking apparatus 10 while a regenerative braking state is in a section in which a time period t3 to t4 in which the regenerative braking cooperative control section t2 to t4 almost ends overlaps the ABS maintaining section t3 to t6 in the ABS started state.

As yet another example, as illustrated in FIGS. 2 and 3, the controller 108 may transmit the CTP value to the braking apparatus 10 while a regenerative braking state is in a section in which the time period t3 to t4 in which the regenerative braking cooperative control section t2 to t4 almost ends, the ABS maintaining section t3 to t6 in the ABS started state and the compensation pressure applying section t3 to t6 for applying a compensation pressure signal for compensating for regenerative braking overlap.

In addition, as illustrated in FIGS. 2 and 3, the controller 108 may gradually raise a pulse pattern of the coast regeneration torque signal by a predetermined slope (S1) and may gradually lower the pulse pattern by a predetermined slope (S2) to apply the coast regeneration torque signal during the coast regeneration torque applying section t3 to t7.

Here, the controller 108 may gradually raise a pulse pattern of the compensation pressure signal by a predetermined slope (S3) and may lower the pulse pattern by a predetermined slope (S4) to apply the compensation pressure signal during the compensation pressure applying section t3 to t6.

Accordingly, a pulse pattern of the CTP value may gradually rise by a predetermined slope for an initial maintaining time period t3 to t4 of the ABS maintaining section t3 to t6 in the ABS started state (S5), may maintain a predetermined level for a middle maintaining time period t4 to t5 after the initial maintaining time period t3 to t4 (S6), and may gradually fall by a predetermined slope for an ABS maintaining section ending time period t5 to t6 in the ABS maintaining section t3 to t6 (S7).

Therefore, since the pulse pattern of the CTP value prevents a brake from braking while being pushed and from suddenly braking, an abnormal feeling can be further suppressed and ride comfort can be further improved.

Meanwhile, although not illustrated in the drawings, the inputter 102, the determiner 104, the calculator 106, and the controller 108 may be provided in a conventional electric control unit (ECU, not shown) which is applied to a vehicle as a main computer, controls the overall operations thereof, determines and calculates a current pressure value corresponding to a coast regeneration torque value, and receives a regenerative braking signal, an ABS operation signal, and a driver's current necessary braking pressure value.

In addition, although not illustrated in the drawings, the inputter 102, the determiner 104, the calculator 106, and the controller 108 may be provided in a micro control unit (MCU, not shown) which includes a processer, a memory, and input and output parts installed in a single chip, controls the overall operations thereof, determines and calculates a current pressure value corresponding to a coast regeneration torque value, and receives a regenerative braking signal, an ABS operation signal, and a driver's current necessary braking pressure value.

In addition, although not illustrated in the drawings, the inputter 102, the determiner 104, the calculator 106, and the controller 108 are not limited thereto, but may be any control unit, determination unit, calculation unit, and input unit capable of controlling operations, determining and calculating a current pressure value corresponding to a coast regeneration torque value, and receiving a regenerative braking signal, an ABS operation signal, and a driver's current necessary braking pressure value.

Here, the inputter 102, the determiner 104, the calculator 106, and the controller 108 may be provided in an integrated ECU (not shown) or MCU (not shown), or in a separated ECU (not shown) or MCU (not shown).

Meanwhile, although not illustrated in the drawings, the vehicle control apparatus 100 may be applied to at least one of a hybrid vehicle (not shown) and an electric vehicle (not shown).

A vehicle control method of the vehicle control apparatus 100 according to one embodiment of the present disclosure for controlling a vehicle will be described below with reference to FIG. 4.

Figure 4:
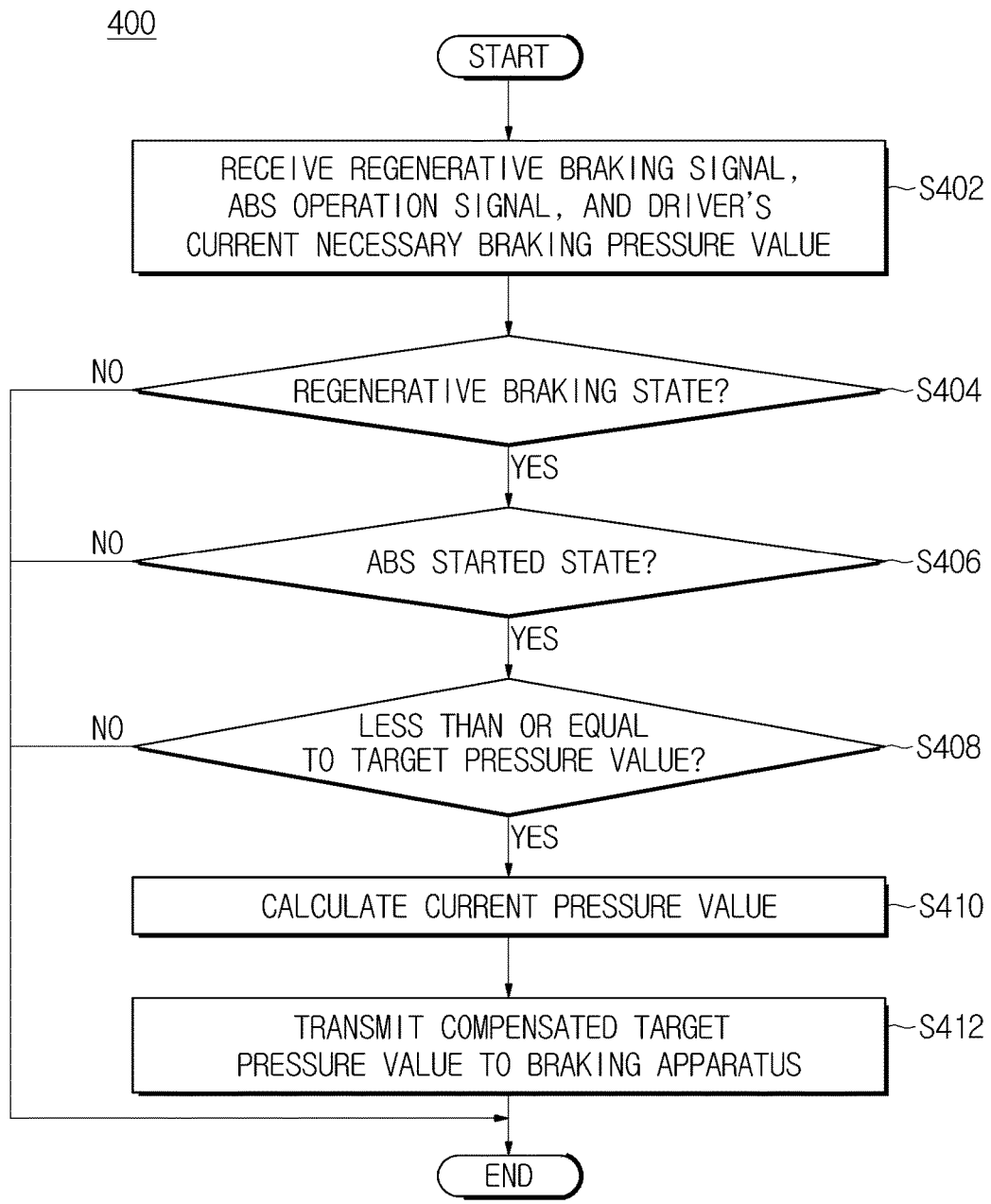
FIG. 4 is a flowchart showing one example of a vehicle control method of the vehicle control apparatus according to one embodiment of the present disclosure.

FIG. 4 is a flowchart showing one example of a vehicle control method of the vehicle control apparatus according to one embodiment of the present disclosure.

Referring to FIG. 4, a vehicle control method 400 of the vehicle control apparatus 100 (see FIG. 2) according to one embodiment of the present disclosure includes an inputting operation (S402), determining operations (S404, S406, and S408), a calculating operation (S410), and a compensating operation (S412).

First, in the inputting operation (S402), the inputter 102 (see FIG. 2) receives a regenerative braking signal, an ABS operation signal, and a driver's current necessary braking pressure value output from the braking apparatus 10 (see FIG. 2)

Next, in the determining operation (S404), the determiner 104 (see FIG. 2) determines whether the regenerative braking signal input to the inputter 102 (see FIG. 2) is in the regenerative braking state according to control of the controller 108 (see FIG. 2).

Next, in the determining operation (S406), when the regenerative braking signal is determined in the regenerative braking state by the determiner 104 (see FIG. 2), the determiner 104 (see FIG. 2) determines whether the ABS operation signal input to the inputter 102 (see FIG. 2) is in the ABS started state according to the control of the controller 108 (see FIG. 2).

Next, in the determining operation (S408), the determiner 104 (see FIG. 2) determines whether the driver's current necessary braking pressure value input to the inputter 102 (see FIG. 2) is in the first state in which the driver's current necessary braking pressure value is less than or equal to a target pressure value set in the determiner 104 (see FIG. 2), according to the control of the controller 108 (see FIG. 2).

Here, in the determining operation (S408), the determiner 104 (see FIG. 2) may determine whether the regenerative braking signal is in the regenerative braking state, whether the ABS operation signal is in the ABS started state, and whether the driver's current necessary braking pressure value is in the first state in which the driver's current necessary braking pressure value is less than or equal to the target pressure value set in the determiner 104 (see FIG. 2), during the driver's braking section t1 to t6 (see FIG. 3) for applying a driver's braking signal according to the control of the controller 108 (see FIG. 2).

As one example, in the determining operation (S408), when the regenerative braking state is in the regenerative braking cooperative control section t2 to t4 (see FIG. 3), the determiner 104 (see FIG. 2) may determine whether the driver's current necessary braking pressure value is in the first state in which the driver's current necessary braking pressure value is less than or equal to the target pressure value set in the determiner 104 (see FIG. 2), according to the control of the controller 108 (see FIG. 2).

As another example, in the determining operation (S408), when the regenerative braking state is in a section in which the regenerative braking cooperative control section t2 to t4 (see FIG. 3) overlaps the ABS maintaining section t3 to t6 (see FIG. 3) in the ABS started state, the determiner 104 (see FIG. 2) may determine whether the driver's current necessary braking pressure value is in the first state in which the driver's current necessary braking pressure value is less than or equal to the target pressure value set in the determiner 104 (see FIG. 2), according to the control of the controller 108 (see FIG. 2).

Next, in the calculating operation (S410), when the regenerative braking signal is determined in the regenerative braking state, the ABS operation signal is in the ABS started state, and the driver's current necessary braking pressure value is in the first state, in which the driver's current necessary braking pressure value is less than or equal to the target pressure value set in the determiner 104 (see FIG. 2), by the determiner 104 (see FIG. 2), the calculator 106 (see FIG. 2) calculates a current pressure value corresponding to a coast regeneration torque value, which is a braking force generated by the electric motor for performing regenerative braking in the electric motor of the braking apparatus 10 (see FIG. 2), by using the coast regeneration torque value according to the control of the controller 108 (see FIG. 2).

As one example, in the calculating operation (S410), the calculator 106 (see FIG. 2) may calculate the current pressure value corresponding to the coast regeneration torque value according to the control of the controller 108 (see FIG. 2) during the ABS maintaining section t3 to t6 (see FIG. 3) in the ABS started state.

That is, in the calculating operation (S410), the calculator 106 (see FIG. 2) may calculate the current pressure value corresponding to the coast regeneration torque value according to the control of the controller 108 (see FIG. 2) during a section in which the ABS maintaining section t3 to t6 (see FIG. 3) in the ABS started state overlaps the coast regeneration torque applying section t3 to t7 (see FIG. 3) for applying a coast regeneration torque signal.

Next, in the compensating operation (S412), the controller 108 (see FIG. 2) converts the current pressure value calculated by the calculator 106 (see FIG. 2) into a ratio of the current pressure value to the driver's current necessary braking pressure value to compensate for the target pressure value and transmits the CTP value (see FIG. 3) to the braking apparatus 10 (see FIG. 2).

As one example, in the compensating operation (S412), the controller 108 (see FIG. 2) may convert the current pressure value calculated by the calculator 106 (see FIG. 2) into the ratio of the current pressure value to the driver's current necessary braking pressure value to compensate for the target pressure value during the compensation pressure applying section t3 to t6 (see FIG. 3) for applying a compensation pressure signal for compensating for regenerative braking.

As another example, in the compensating operation (S412), the controller 108 (see FIG. 2) may transmit the CTP value (see FIG. 3) to the braking apparatus 10 (see FIG. 2) when the regenerative braking state is in the regenerative braking cooperative control section t2 to t4 (see FIG. 3).

As still another example, in the compensating operation (S412), the controller 108 (see FIG. 2) may transmit the CTP value (see FIG. 3) to the braking apparatus 10 (see FIG. 2) while a regenerative braking state is in a section in which the regenerative braking cooperative control section t2 to t4 (see FIG. 3) overlaps the ABS maintaining section t3 to t6 (see FIG. 3) in the ABS started state.

As yet another example, in the compensating operation (S412), the controller 108 (see FIG. 2) may transmit the CTP value (see FIG. 3) to the braking apparatus 10 (see FIG. 2) while a regenerative braking state is in a section in which the regenerative braking cooperative control section t2 to t4 (see FIG. 3), the ABS maintaining section t3 to t6 (see FIG. 3) in the ABS started state and the compensation pressure applying section t3 to t6 (see FIG. 3) for applying a compensation pressure signal for compensating for regenerative braking overlap.

As yet another example, in the compensating operation (S412), the controller 108 (see FIG. 2) may transmit the CTP value (see FIG. 3) to the braking apparatus 10 (see FIG. 2) while a regenerative braking state is in a section in which the time period t3 to t4 (see FIG. 3) in which the regenerative braking cooperative control section t2 to t4 (see FIG. 3) almost ends overlaps the ABS maintaining section t3 to t6 (see FIG. 3) in the ABS started state.

As yet another example, in the compensating operation (S412), the controller 108 (see FIG. 2) may transmit the CTP value (see FIG. 3) to the braking apparatus 10 (see FIG. 2) while a regenerative braking state is in a section in which the time period t3 to t4 (see FIG. 3) in which the regenerative braking cooperative control section t2 to t4 (see FIG. 3) almost ends, the ABS maintaining section t3 to t6 (see FIG. 3) in the ABS started state and the compensation pressure applying section t3 to t6 (see FIG. 3) for applying a compensation pressure signal for compensating for regenerative braking overlap.

In addition, in the calculating operation (S410), the controller 108 (see FIG. 2) may gradually raise the pulse pattern of the coast regeneration torque signal by the predetermined slope (S1, see FIG. 3) and may gradually lower the pulse pattern by the predetermined slope (S2, see FIG. 3) to apply the coast regeneration torque signal during the coast regeneration torque applying section t3 to t7 (see FIG. 3).

Here, in the compensating operation (S412), the controller 108 (see FIG. 2) may gradually raise the pulse pattern of the compensation pressure signal by the predetermined slope (S3, see FIG. 3) and may gradually lower the pulse pattern by the predetermined slope (S4, see FIG. 3) to apply the compensation pressure signal during the compensation pressure applying section t3 to t6 (see FIG. 3).

Accordingly, the pulse pattern of the CTP value may gradually rise by the predetermined slope for the initial maintaining time period t3 to t4 of the ABS maintaining section t3 to t6 in the ABS started state (S5), may be maintained at the predetermined level for the middle maintaining time period t4 to t5 after the initial maintaining time period t3 to t4 (S6), and may gradually fall by the predetermined slope for the ABS maintaining section ending time period t5 to t6 of the ABS maintaining section t3 to t6 (S7).

Figure 5:
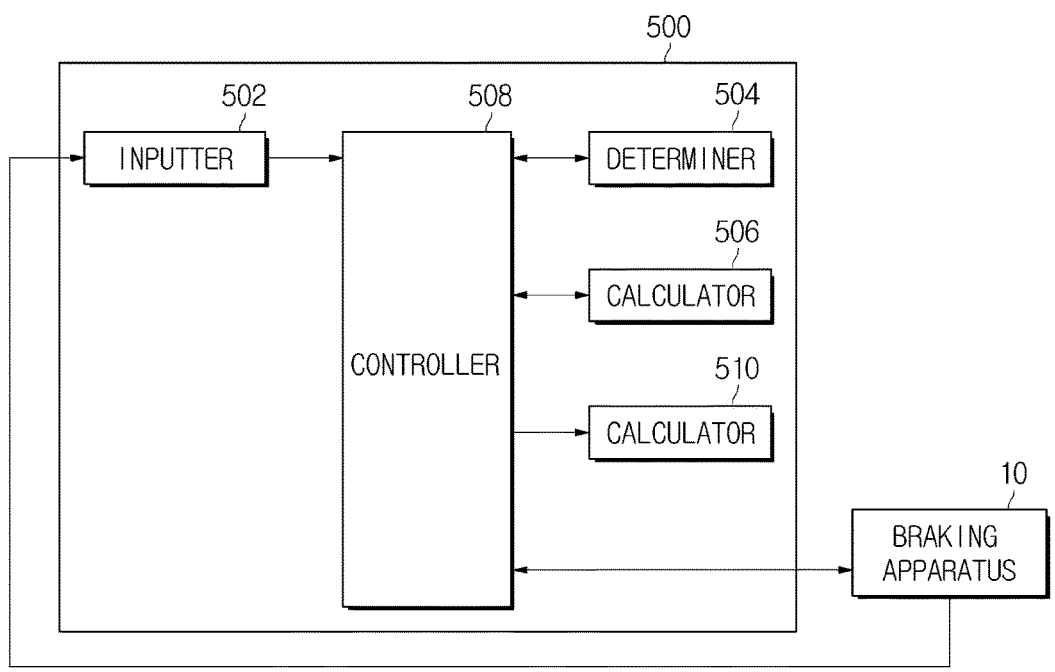
FIG. 5 is a block diagram showing another example of the vehicle control apparatus according to one embodiment of the present disclosure.

FIG. 5 is a block diagram showing another example of the vehicle control apparatus according to one embodiment of the present disclosure.

Referring to FIG. 5, a vehicle control apparatus 500 according to one embodiment of the present disclosure includes an inputter 502, a determiner 504, a calculator 506, and a controller 508 which are the same as those of the vehicle control apparatus 100 (see FIG. 2).

Accordingly, since functions and organic connection relations of the elements included in the vehicle control apparatus 500 according to one embodiment of the present disclosure are the same as those of the vehicle control apparatus 100 (see FIG. 2), additional descriptions thereof will be omitted below.

Here, the vehicle control apparatus 500 according to one embodiment of the present disclosure may further include an identifier 510.

That is, when a driver's current necessary braking pressure value is determined in a first state, in which the driver's current necessary braking pressure value is less than or equal to a target pressure value set in the determiner 504, by the determiner 504, the identifier 510 may inform the driver of a situation in which current regenerative braking has to be compensated according to control of the controller 508.

In addition, when the controller 508 transmits a CTP value (see FIG. 3) to a braking apparatus 10, the identifier 510 may inform the driver that the current regenerative braking is compensated and performed according to the control of the controller 508.

In addition, when the controller 508 receives a regenerative braking compensation complete signal from the braking apparatus 10, the identifier 510 may inform the driver that the current regenerative braking is completely compensated according to the control of the controller 508.

Here, although not illustrated in the drawing, the identifier 510 may include at least one device among an alarm (not shown), a speaker (not shown), and a light emitting member (not shown) provided to inform the driver of information or a state of a vehicle, and may inform the driver of a situation in which current regenerative braking has to be compensated, the current regenerative braking is compensated and performed, or the current regenerative braking is completely compensated through at least one operation among an alarm operation of the alarm (not shown), a sounding operation of the speaker (not shown), and a lighting operation of the light emitting member (not shown).

In addition, although not illustrated in the drawing, the identifier 510 may include at least one of a human machine interface (HMI) module (not shown) and a head-up display (HUD) module (not shown) mounted such that the driver is interfaced with a machine to check information or the state of the vehicle, and may inform the driver of a situation in which the current regenerative braking has to be compensated, the current regenerative braking is compensated and performed, or the current regenerative braking is completely compensated through at least one operation of message display operations of the HMI module (not shown) and the HUD module (not shown).

Vehicle control methods of controlling a vehicle using the vehicle control apparatus 500 according to one embodiment of the present disclosure will be described below with reference to FIGS. 6 to 8.

Figure 6:
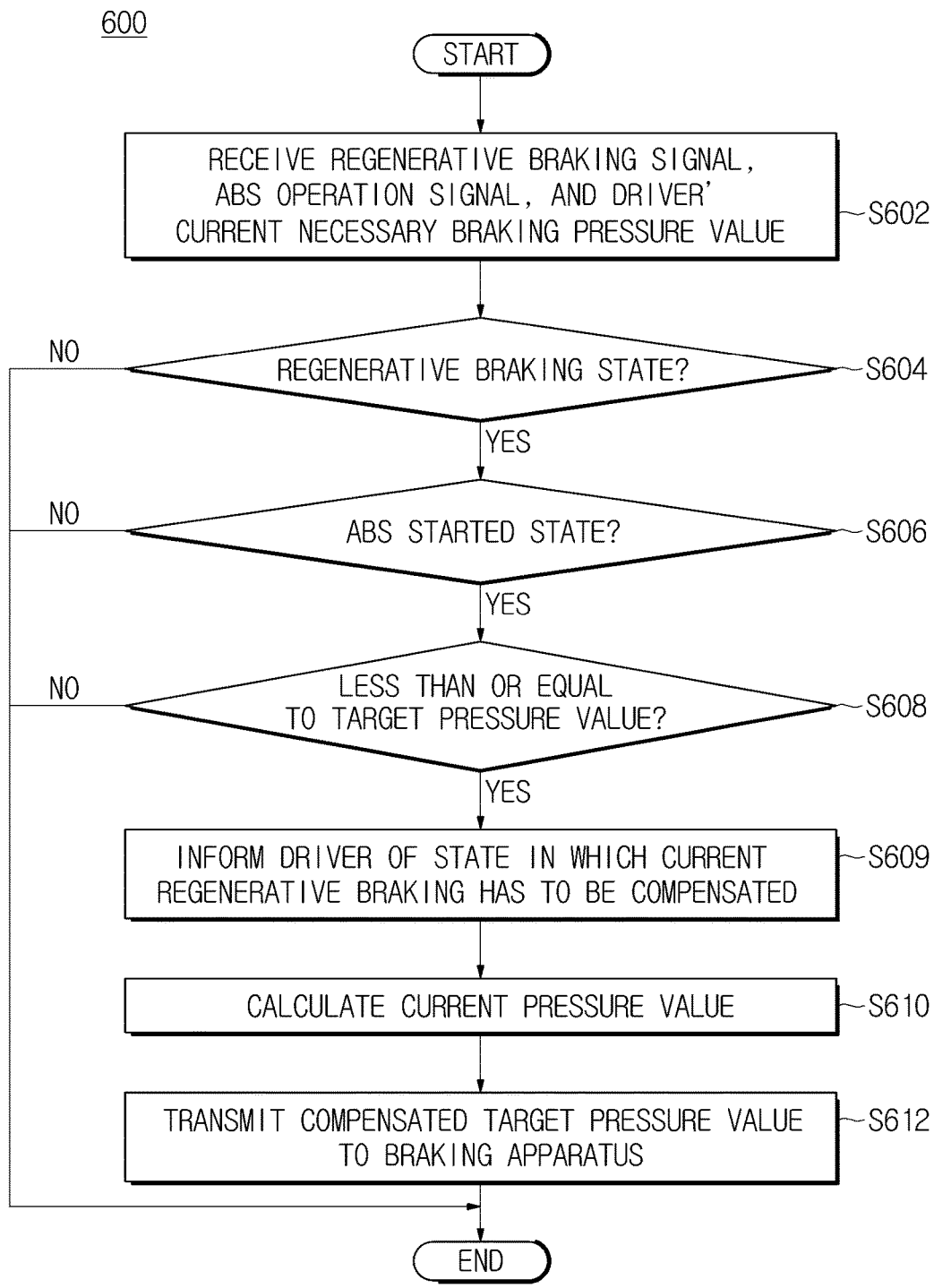
FIG. 6 is a flowchart showing another example of the vehicle control method of the vehicle control apparatus according to one embodiment of the present disclosure.
Figure 7:
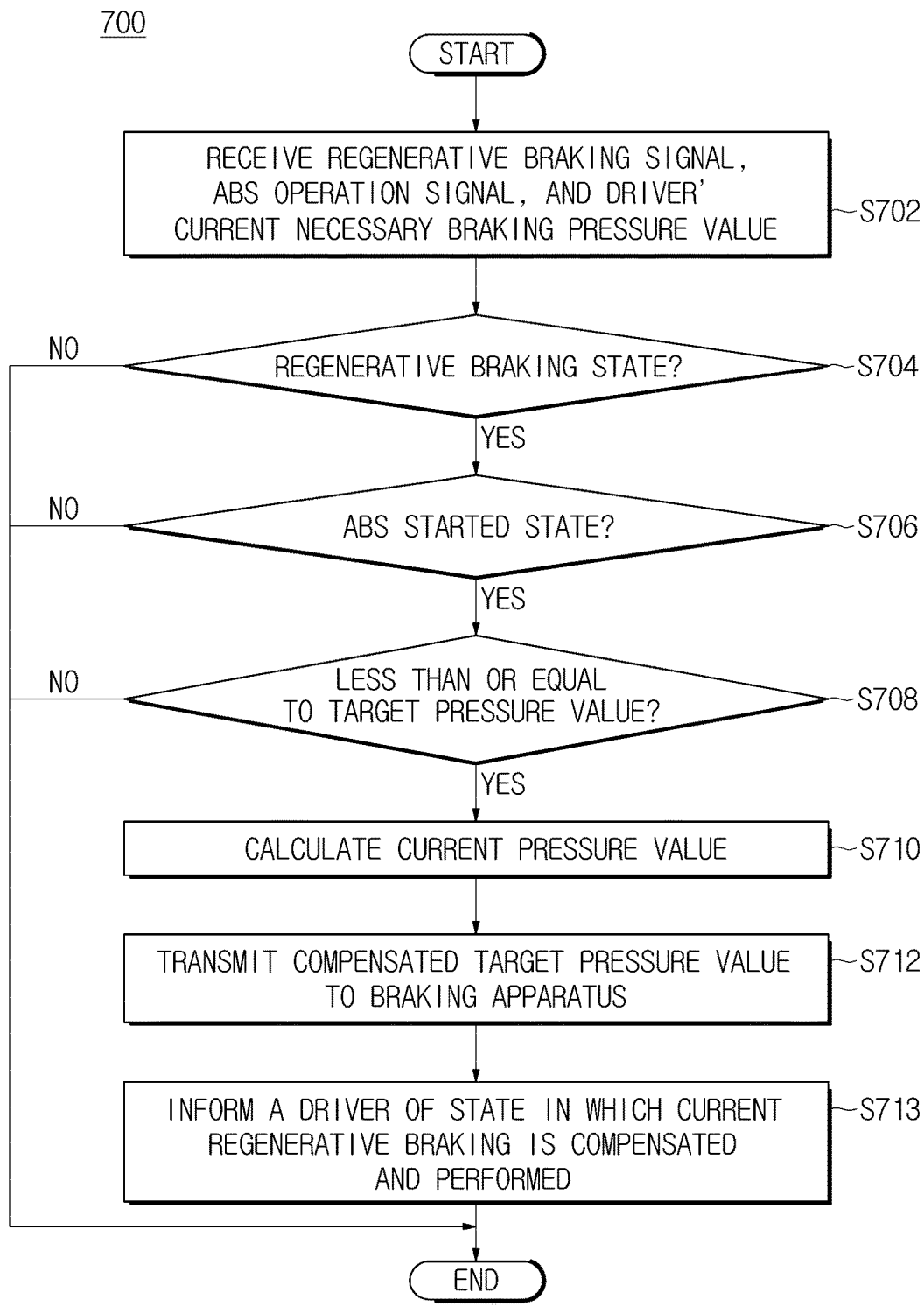
FIG. 7 is a flowchart showing still another example of the vehicle control method of the vehicle control apparatus according to one embodiment of the present disclosure.

FIG. 6 is a flowchart showing another example of the vehicle control method of the vehicle control apparatus according to one embodiment of the present disclosure, and FIG. 7 is a flowchart showing still another example of the vehicle control method of the vehicle control apparatus according to one embodiment of the present disclosure.

Figure 8:
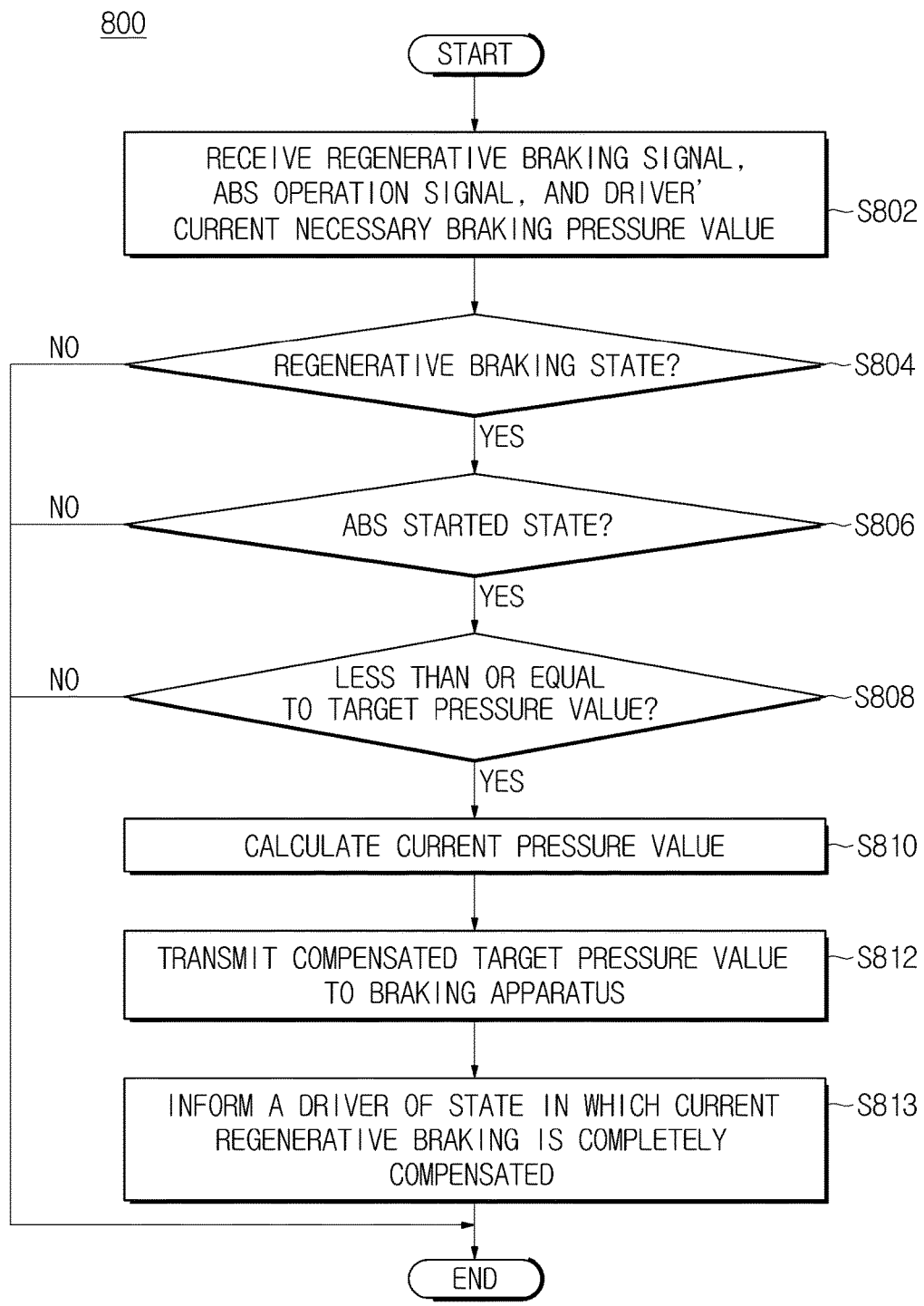
FIG. 8 is a flowchart showing yet another example of the vehicle control method of the vehicle control apparatus according to one embodiment of the present disclosure.

FIG. 8 is a flowchart showing yet another example of the vehicle control method of the vehicle control apparatus according to one embodiment of the present disclosure.

Referring to FIGS. 6 to 8, in the vehicle control apparatus 500 (see FIG. 5) according to one embodiment of the present disclosure, a vehicle control method 600 includes an inputting operation (S602), determining operations (S604, S606, and S608), a calculating operation (S610), and a compensating operation (S612), a vehicle control method 700 includes an inputting operation (S702), determining operations (S704, S706, and S708), a calculating operation (S710), and a compensating operation (S712), and a vehicle control method 800 includes an inputting operation (S802), determining operations (S804, S806, and S808), a calculating operation (S810), and a compensating operation (S812), wherein each of the above vehicle control methods 600, 700, and 800 is the same as the vehicle control method 400 (see FIG. 4) of the vehicle control apparatus 100 (see FIG. 2).

Accordingly, since functions and organic connection relations of elements of each of the vehicle control methods 600, 700, and 800 of the vehicle control apparatus 500 (see FIG. 5) according to one embodiment of the present disclosure are the same as those of the vehicle control method 400 (see FIG. 4) of the vehicle control apparatus 100 (see FIG. 2), additional descriptions thereof will be omitted below.

Here, the vehicle control methods 600, 700, and 800 of the vehicle control apparatus 500 (see FIG. 5) according to one embodiment of the present disclosure may respectively further include a first identifying operation (S609), a second identifying operation (S713), and a third identifying operation (S813).

That is, in the first identifying operation (S609), when a driver's current necessary braking pressure value is determined to be in a first state in which the driver's current necessary braking pressure value is less than or equal to a target pressure value set in the determiner 504 (see FIG. 5), the identifier 510 (see FIG. 5) may inform a driver of a situation in which current regenerative braking has to be compensated according to control of the controller 508 (see FIG. 5).

In addition, in the second identifying operation (S713), when the controller 508 (see FIG. 5) transmits a CTP value (see FIG. 3) to the braking apparatus 10 (see FIG. 5), the identifier 510 (see FIG. 5) may inform a driver that a current regenerative braking is compensated and performed according to control of the controller 508 (see FIG. 5).

In addition, in the third identifying operation (S813), when the controller 508 (see FIG. 5) receives a regenerative braking compensation complete signal from the braking apparatus 10 (see FIG. 5), the identifier 510 (see FIG. 5) may inform a driver that a current regenerative braking is completely compensated according to control of the controller 508 (see FIG. 5).

As described above, the vehicle control apparatus 100 according to one embodiment of the present disclosure includes the inputter 102, the determiner 104, the calculator 106, and the controller 108, and the control method 400 thereof performs the inputting operation (S402), the determining operations (S404, S406, and S408), the calculating operation (S410), and the compensating operation (S412). The vehicle control apparatus 500 according to one embodiment of the present disclosure includes the inputter 502, the determiner 504, the calculator 506, and the controller 508, and the control method 600 thereof performs the inputting operation (S602), the determining operations (S604, S606, and S608), the calculating operation (S610), and the compensating operation (S612). The control method 700 of the vehicle control apparatus 500 according to one embodiment of the present disclosure performs the inputting operation (S702), the determining operations (S704, S706, and S708), the calculating operation (S710), and the compensating operation (S712). In addition, the control method 800 of the vehicle control apparatus 500 according to one embodiment of the present disclosure performs the inputting operation (S802), the determining operations (S804, S806, and S808), the calculating operation (S810), and the compensating operation (S812).

Accordingly, in the vehicle control apparatus 100 according to one embodiment of the present disclosure and the control method 400 thereof, and the vehicle control apparatus 500 according to one embodiment of the present disclosure and the control methods 600, 700, and 800 thereof, since a pressure value corresponding to a coast regeneration torque value may compensate for a coast regeneration torque value when ABS control starts in a state in which regenerative braking is being performed, a braking force is constantly maintained, and thus uniform deceleration is constantly maintained.

Accordingly, in the vehicle control apparatus 100 according to one embodiment of the present disclosure and the control method 400 thereof, and the vehicle control apparatus 500 according to one embodiment of the present disclosure and the control methods 600, 700, and 800 thereof, a deceleration feeling that a driver feels can be improved to suppress an abnormal feeling of braking.

In addition, the vehicle control apparatus 500 according to one embodiment of the present disclosure may further include the identifier 510 and the control methods 600, 700, and 800 thereof may respectively perform the first identifying operation (S609), the second identifying operation (S713), and third identifying operation (S813).

Accordingly, the vehicle control apparatus 500 according to one embodiment of the present disclosure and the control methods 600, 700, and 800 may inform a driver of a situation in which current regenerative braking has to be compensated, the current regenerative braking is compensated and performed, or the current regenerative braking is completely compensated.

Accordingly, in the vehicle control apparatus 500 according to one embodiment of the present disclosure and the control methods 600, 700, and 800, since a driver may identify a situation in which current regenerative braking has to be compensated, the current regenerative braking is compensated and performed, or the current regenerative braking is completely compensated, the driver can be induced to drive carefully, and thus the driver's anxiety about a state of the current regenerative braking can be suppressed.

As is apparent from the above description, a vehicle control apparatus and a control method thereof according to an embodiment of the present disclosure can improve a deceleration feeling that a driver feels to suppress an abnormal feeling of braking.

In addition, a vehicle control apparatus and a control method thereof according to an embodiment of the present disclosure can suppress anxiety that a driver feels about a state of current regenerative braking while inducing the driver to drive carefully.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle control apparatus comprising:
    an inputter configured to receive a regenerative braking signal and an anti-lock brake system (ABS) operation signal output by a braking apparatus and a driver's current necessary braking pressure value;
    a determiner configured to determine whether the input regenerative braking signal is in a regenerative braking state, whether the input ABS operation signal is in an ABS started state, and whether the input driver's current necessary braking pressure value is in a first state in which the driver's current necessary braking pressure value is less than or equal to a preset target pressure value;
    a calculator configured to calculate a current pressure value based on a coast regeneration torque value when the input driver's current necessary braking pressure value is in the first state, wherein the coast regeneration torque value is used to perform a regenerative braking, and generated from an electric motor of the braking apparatus; and
    a controller configured to
        convert the calculated current pressure value into a ratio of the current pressure value to the driver's current necessary braking pressure value to generate a compensated target pressure value, based on the ratio, which is used for compensating the preset target pressure value, and
        transmit the compensated target pressure value to the braking apparatus to thereby operate the braking apparatus.

2. The vehicle control apparatus of claim 1, wherein the determiner determines whether the input driver's current necessary braking pressure value is in the first state when the regenerative braking state is in a regenerative braking cooperative control section.

3. The vehicle control apparatus of claim 1, wherein the determiner determines whether the input driver's current necessary braking pressure value is in the first state when the regenerative braking state is in a section in which a regenerative braking cooperative control section overlaps an ABS maintaining section in the ABS started state.

4. The vehicle control apparatus of claim 1, wherein the determiner further determines whether the input driver's current necessary braking pressure value is in the first state in which the driver's current necessary braking pressure value is less than or equal to the preset target pressure value, when the determiner determines whether the input regenerative braking signal is in the regenerative braking state and the input ABS operation signal is in an ABS operation start prohibition state.

5. The vehicle control apparatus of claim 1, wherein the calculator calculates the current pressure value corresponding to the coast regeneration torque value during an ABS maintaining section in the ABS started state.

6. The vehicle control apparatus of claim 1, wherein the calculator calculates the current pressure value corresponding to the coast regeneration torque value during a section in which an ABS maintaining section in the ABS started state overlaps a coast regeneration torque applying section for applying a coast regeneration torque signal.

7. The vehicle control apparatus of claim 1, wherein the controller converts the calculated current pressure value into the ratio of the current pressure value to the driver's current necessary braking pressure value to compensate the target pressure value during a compensation pressure applying section for applying a compensation pressure signal for compensating for regenerative braking.

8. The vehicle control apparatus of claim 1, wherein the controller transmits the compensated target pressure value to the braking apparatus when the regenerative braking state is in a regenerative braking cooperative control section.

9. The vehicle control apparatus of claim 1, wherein the controller transmits the compensated target pressure value to the braking apparatus while the regenerative braking state is in a section in which a regenerative braking cooperative control section overlaps an ABS maintaining section in the ABS started state.

10. The vehicle control apparatus of claim 1, wherein the controller transmits the compensated target pressure value to the braking apparatus while the regenerative braking state is in a section in which a regenerative braking cooperative control section, an ABS maintaining section in the ABS started state, and a compensation pressure applying section for applying a compensation pressure signal for compensating for regenerative braking overlap.

11. The vehicle control apparatus of claim 1, wherein the controller transmits the compensated target pressure value to the braking apparatus while the regenerative braking state is in a section in which a time period in which a regenerative braking cooperative control section almost ends overlaps an ABS maintaining section in the ABS started state.

12. The vehicle control apparatus of claim 1, wherein the controller transmits the compensated target pressure value to the braking apparatus while the regenerative braking state is in a section in which a time period in which a regenerative braking cooperative control section almost ends, an ABS maintaining section in the ABS started state and a compensation pressure applying section for applying a compensation pressure signal for compensating for regenerative braking overlap.

13. The vehicle control apparatus of claim 1, wherein a pulse pattern of the compensated target pressure value:

gradually rises by a predetermined slope for an initial maintaining time period of an ABS maintaining section in the ABS started state;

maintains a predetermined level for a middle maintaining time period after the initial maintaining time period; and gradually falls by a predetermined slope from a time at which the ABS maintaining section almost ends in the ABS maintaining section.

14. A vehicle control method comprising:

inputting a regenerative braking signal and an anti-lock brake system (ABS) operation signal output from a braking apparatus, and a driver's current necessary braking pressure value;

determining whether the input regenerative braking signal is in a regenerative braking state, whether the input ABS operation signal is in the ABS started state, and whether the input driver's current necessary braking pressure value is in a first state in which the driver's current necessary braking pressure value is less than or equal to a preset target pressure value;

calculating a current pressure value based on a coast regeneration torque value when the input driver's current necessary braking pressure value is in the first state, wherein the coast regeneration torque value is used to perform a regenerative braking, and generated from an electric motor of the braking apparatus;

generating a compensated target pressure value which is used to compensate the preset target pressure value, wherein the compensated target pressure is generated based on a ratio of the calculated current pressure value to the driver's current necessary braking pressure value which is converted by the calculated current pressure value into; and transmitting the compensated target pressure value to the braking apparatus.

15. The vehicle control method of claim 14, wherein the determining further determines whether the input driver's current necessary braking pressure value is in the first state in which the driver's current necessary braking pressure value is less than or equal to the preset target pressure value, when the determining determines whether the input regenerative braking signal is in the regenerative braking state and the input ABS operation signal is in an ABS operation start prohibition state.

* * * * *